6680X
I. JENNINGS.
SPIRIT LAMP.
Patented Aug. 1, 1831.
NO PRINTED COPY OF SPECIFICATION IN OFFICE.
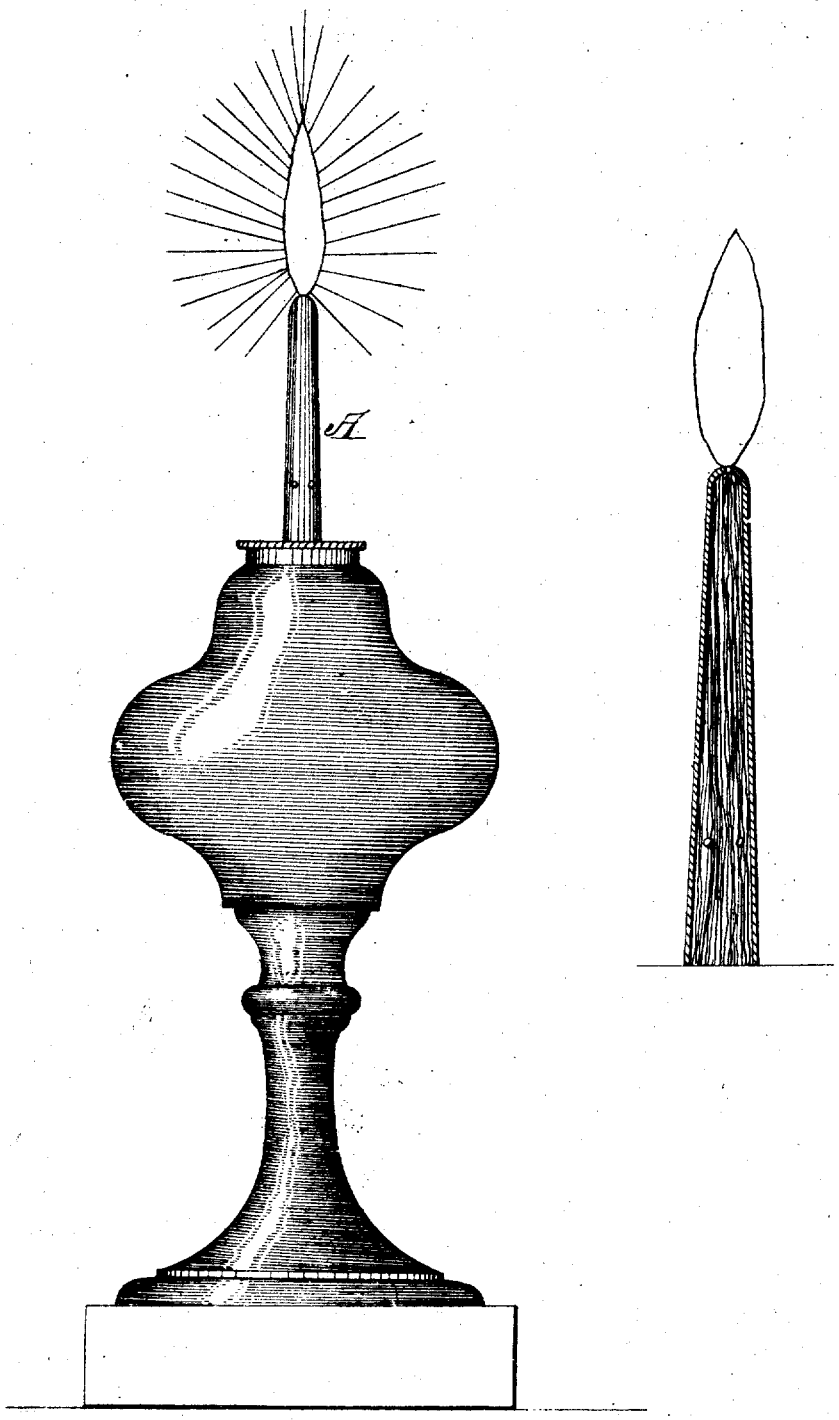

Isaiah Jennings X 6680

The schedule referred to in these Letters Patent and making part of the same containing a description in the words of the said Isaiah Jennings himself of his improvement in Lamps for burning vapor-able ingredients

---

To all whom it may concern. be it known that I, Isaiah Jennings of the City of New York have invented an improvement in the common lamp which adapts it especially to the combustion of the combination of Alcohol and of Spirits of turpentine, and of other essential oils and ingredients, for the use of which ingredients Letters Patent of the United States have been already issued to me and which improvement in the lamp is also applicable to the combustion of other vapo-rable ingredients not specified in the Letters Patent above alluded to. And I do hereby declare that the following is a full and exact description of my said improvement in the lamp Instead of the tube constructed in the ordinary manner, for containing the cotton or other wick which is in them allowed to project through the tube or burner. and lighted at the top thereof. I make a brass or other tube which I cause to rise to a much greater height above the reservoir, or body of the lamp than is usually done, say for example to the height of two inches, the upper end of this tube I close entirely or simply drill a small hole therein of such size as may suit the ingredients to be burned; but not generally exceed-ing one thirtieth of an inch in diameter. Through the sides of the said tube and at about half an inch, more or less, from its lower end, where it joins the body

X6680 body of the lamp. I drill four or any other number of similar holes. A tube thus constructed forms the main feature of my improvement, and in order to use this lamp, I insert a wick of cotton, a bundle of fine wire, or any other fibrous material which will raise the fluid from the lamp by capillary attraction; allowing the wick to rise to the upper end of the tube and and to descend into the fluid the vapour of which is to be burnt. When this lamp is to be lighted all that is necessary is to apply flame to the small opening above described, when the vapour which escapes therefrom will be inflamed, and the heat generated by this inflammation operating upon the tube will increase the evaporation so as to produce a brilliant light without the destruction of the wick or other fibrous substance.

What I claim as new used as my improvement in the lamp and which is applicable to such lamps as are now in use is the tube or burner for containing the wick or other fibrous substance, constructed in the manner or upon the principle herein before explained.

Witnesses
Thos P. Jones
Walter S. Magruder

Isaiah Jennings

[320 wds]